US010481613B2

(12) United States Patent
Schroeder et al.

(10) Patent No.: US 10,481,613 B2
(45) Date of Patent: Nov. 19, 2019

(54) METHOD AND DEVICE FOR OPERATING A VEHICLE (71) Applicant: Robert Bosch GmbH, Stuttgart (DE)

(72) Inventors: Christoph Schroeder, Sunnyvale, CA (US); Oliver Pink, Ditzingen (DE); Stefan Nordbruch, Kornwestheim (DE); Svetlana Rau, Stuttgart (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 15/547,561

(22) PCT Filed: Jan. 14, 2016

(86) PCT No.: PCT/EP2016/050673
§ 371 (c)(1),
(2) Date: Jul. 31, 2017

(87) PCT Pub. No.: WO2016/120083
PCT Pub. Date: Aug. 4, 2016

(65) Prior Publication Data
US 2018/0011497 A1    Jan. 11, 2018

(30) Foreign Application Priority Data
Jan. 29, 2015   (DE) .......................... 10 2015 201 555

(51) Int. Cl.
*G05D 1/02* (2006.01)
*B60W 30/165* (2012.01)
(Continued)

(52) U.S. Cl.
CPC .......... *G05D 1/0287* (2013.01); *B60W 30/12* (2013.01); *B60W 30/165* (2013.01);
(Continued)

(58) Field of Classification Search
CPC .. G05D 1/0287; B60W 50/14; B60W 30/165; B60W 30/12; B60W 2550/10;
(Continued)

(56) References Cited

U.S. PATENT DOCUMENTS 5,245,422 A * 9/1993 Borcherts ............ G05D 1/0246
348/119
6,215,392 B1 * 4/2001 Okada ...................... B62D 1/28
340/436

(Continued)

FOREIGN PATENT DOCUMENTS

CN    101859494 A    10/2010
CN    103732480 A    4/2014

(Continued)

OTHER PUBLICATIONS

International Search Report dated May 3, 2016 of the corresponding International Application PCT/EP2016/050673 filed Jan. 14, 2016.

*Primary Examiner* — Jaime Figueroa
(74) *Attorney, Agent, or Firm* — Norton Rose Fulbright US LLP; Gerard Messina (57) ABSTRACT

A vehicle is operable in a first operating mode in which the vehicle travels autonomously inside the traffic lane based on a detection of lane markings of a traffic lane and in a second operating mode in which the vehicle autonomously follows a vehicle driving in front while ignoring lane markings, and a method of its operation includes operating the vehicle in a first of the two operating modes, detecting a vehicle environment, and switching from the first operating mode to the other of the two operating modes as a function of the detected vehicle environment. A device can execute the method and a computer program can be executed by a device for performing the method.

18 Claims, 3 Drawing Sheets

(51) Int. Cl.
  *B60W 30/12* (2006.01)
  *B62D 15/02* (2006.01)
  *B60W 50/14* (2012.01)

(52) U.S. Cl.
  CPC ........... *B60W 50/14* (2013.01); *B62D 15/025* (2013.01); *B62D 15/026* (2013.01); *B60W 2520/10* (2013.01); *B60W 2540/22* (2013.01); *B60W 2540/26* (2013.01); *B60W 2550/10* (2013.01); *B60W 2550/30* (2013.01); *B60W 2550/408* (2013.01)

(58) Field of Classification Search
  CPC ....... B60W 2550/408; B60W 2520/10; B60W 2540/26; B60W 2540/22; B60W 2550/30; B62D 15/025; B62D 15/026
  USPC ...................................................... 701/1, 23
  See application file for complete search history.

(56) References Cited

U.S. PATENT DOCUMENTS

| | | | | |
|---|---|---|---|---|
| 6,370,471 | B1* | 4/2002 | Lohner | B60K 31/0008 701/36 |
| 8,949,016 | B1* | 2/2015 | Ferguson | B60W 30/00 340/436 |
| 9,523,984 | B1* | 12/2016 | Herbach | B62D 15/025 |
| 2005/0043879 | A1* | 2/2005 | Desens | B60K 31/0008 701/96 |
| 2006/0145827 | A1* | 7/2006 | Kuge | B60K 31/0008 340/439 |
| 2007/0055412 | A1* | 3/2007 | Bernhard | B62D 1/28 701/1 |
| 2010/0256852 | A1* | 10/2010 | Mudalige | G08G 1/163 701/24 |
| 2010/0286866 | A1* | 11/2010 | Buerkle | B60T 8/17557 701/33.4 |
| 2010/0304640 | A1* | 12/2010 | Sofman | A63H 17/40 446/456 |
| 2010/0324797 | A1* | 12/2010 | Fritz | B60W 10/06 701/96 |
| 2012/0089299 | A1* | 4/2012 | Breed | B60C 11/24 701/36 |
| 2012/0277947 | A1* | 11/2012 | Boehringer | B60W 30/17 701/23 |
| 2013/0054106 | A1* | 2/2013 | Schmudderich | B60W 30/0956 701/96 |
| 2013/0184926 | A1* | 7/2013 | Spero | B62D 1/28 701/26 |
| 2013/0197762 | A1* | 8/2013 | Schuberth | B62D 5/008 701/42 |
| 2013/0253753 | A1* | 9/2013 | Burnette | G06K 9/2036 701/26 |
| 2014/0088855 | A1* | 3/2014 | Ferguson | G08G 1/166 701/117 |
| 2015/0006028 | A1* | 1/2015 | Strauss | B62D 1/28 701/36 |
| 2016/0026180 | A1* | 1/2016 | Tsimhoni | G05D 1/0061 701/23 |
| 2017/0371337 | A1* | 12/2017 | Ramasamy | G05D 1/0088 |

FOREIGN PATENT DOCUMENTS

| | | |
|---|---|---|
| DE | 10017279 A1 | 10/2000 |
| DE | 102008008172 A1 | 8/2009 |
| DE | 102011116301 A1 | 4/2012 |
| DE | 102012212175 A1 | 1/2014 |
| EP | 2939894 A2 | 11/2015 |
| JP | 2004078333 A | 3/2004 |
| JP | 2004206275 A | 7/2004 |
| JP | 2004322916 A | 11/2004 |
| WO | 2008/071262 A1 | 6/2008 |

\* cited by examiner

METHOD AND DEVICE FOR OPERATING A VEHICLE

CROSS-REFERENCE TO RELATED APPLICATIONS

The present application is the national stage of International Pat. App. No. PCT/EP2016/050673 filed Jan. 14, 2016, and claims priority under 35 U.S.C. § 119 to DE 10 2015 201 555.6, filed in the Federal Republic of Germany on Jan. 29, 2015, the content of each of which are incorporated herein by reference in their entireties.

FIELD OF THE INVENTION

The present invention relates to a method, device, and computer program for operating a vehicle.

BACKGROUND

Driver-assistance systems that support a driver in staying within a lane are known per se. As a rule, such known driver-assistance systems use lane markings for orientation purposes in order to identify the traffic lane and to keep the vehicle inside the traffic lane.

SUMMARY

An objective on which the present invention is based is providing efficient operation of a vehicle that allows for an autonomous operation of a vehicle in different traffic situations.

According to one aspect, a method for operating a vehicle is provided, in which the vehicle is able to be operated in a first operating mode, in which the vehicle travels autonomously in the traffic lane based on a detection of lane markings of a traffic lane; and in which the vehicle is able to be operated in a second operating mode, in which the vehicle autonomously follows a vehicle driving in front while ignoring lane markings, where the method includes operating the vehicle in one of the two operating modes; detecting a vehicle environment; and switching from the one of the two operating modes to the other of the two operating modes as a function of the detected vehicle environment.

According to a still further aspect, a device is provided for operating a vehicle, where the vehicle is able to be operated in a first operating mode in which the vehicle travels autonomously within the traffic lane based on a detection of lane markings of a traffic lane; and is able to be operated in a second operating mode in which the vehicle autonomously follows a vehicle driving in front while ignoring lane markings. The device includes a control device for operating the vehicle in one of the two operating modes and a detection device for detecting a vehicle environment, where the control device is configured to switch from the one operating mode to the other of the two operating modes as a function of the detected vehicle environment.

According to an additional aspect, a computer program is provided, which includes program code for executing the method for operating a vehicle when the computer program is running on a computer.

According to one aspect, a vehicle that is designed or developed to implement or execute the method for operating a vehicle is provided.

In other words, the present invention, among other things, encompasses the notion of switching between the two autonomous operating modes of the vehicle as a function of the detected vehicle environment. This results in a technical advantage of allowing an efficient response to an actual encountered traffic situation inasmuch as it may be useful to operate the vehicle in either the first operating mode or in the second operating mode, depending on the specifically existing traffic situation. As a result, even if a situation exists in which autonomous driving according to the current operating mode is no longer expedient, the vehicle can nevertheless continue to be operated autonomously insofar as a switch to the other operating mode takes place.

For example, there may be situations in which autonomous travel based on a detection of lane markings is no longer possible or expedient. The reason may be missing lane markings, for example. A continuation of a corresponding autonomous travel is therefore no longer an option. However, since the present invention provides for a switch to the second operating mode in such a case, the vehicle is able to continue its autonomous travel because lane markings are ignored in this second operating mode. In other words, lane markings are not taken into account for the autonomous travel in the second operating mode and are therefore ignored.

Thus, "ignoring lane markings" specifically means that the vehicle ignores and consequently does not consider possibly existing lane markings of one or more traffic lane(s) in its autonomous travel, i.e., while autonomously following the vehicle driving in front. Not considering means that the vehicle no longer bases its trajectory planning on possibly existing lane markings. Therefore, this means that possibly existing lane markings no longer play a role in autonomously controlling an actual trajectory of the vehicle to a setpoint trajectory.

Thus, the first operating mode is an operating mode in which the vehicle travels autonomously within the traffic lane based on a detection of lane markings of a traffic lane. In other words, the vehicle uses the lane markings for orientation in the first operating mode in order to keep the vehicle within the lane in an autonomous manner. In particular, this means that the vehicle uses the lane markings as an orientation aid and particularly uses them for identifying a traffic lane. In this first operating mode, the vehicle is therefore kept inside the traffic lane in an autonomous manner.

The first operating mode usually leads to autonomous traveling of the vehicle that generally adheres to the law. In Germany, this would be the Strassenverkehrsordnung (StVO) (Road Traffic Act (RTA)), which mandates that, as a rule, a vehicle is to be driven within lane markings of a traffic lane. In other words, in the first operating mode the vehicle is driving autonomously as prescribed by the law, such as the RTA.

The behavior of the vehicle in the first operating mode can thus be referred to as an RTA-behavior, in particular, and as a behavior in compliance with the law in general.

In the second operating mode, the vehicle ignores possibly existing lane markings and autonomously follows a vehicle traveling in front, meaning that the vehicle utilizes the vehicle driving in front for its own orientation during its autonomous travel. It ignores lane markings in so doing, so that the vehicle will no longer be necessarily traveling within the traffic lane. Situations can therefore arise in which the vehicle leaves the traffic lane due to the trailing, i.e., drives over the lane marking. Such a lane departure, or in other words, such crossing of lane markings, is not intended in the first operating mode and is particularly to be avoided in the first operating mode, thus constituting an impermissible behavior. In the second operating mode, on the other hand, such a behavior is allowed.

As a result, it is possible to respond to situations in which autonomous lane-keeping is not expedient in an effective and efficient manner.

There may also be situations in which it is impossible to unequivocally distinguish lane markings from one another, for instance because there are too many lane markings. This may be the case when driving in an area experiencing roadwork, for example. In addition, there are roads where lane markings are no longer provided, possibly only for a brief period of time. It would therefore not even be possible to operate the vehicle in the first operating mode. A driver would thus have to manually control the vehicle again. However, since the present invention allows for a switch to the second operating mode in such a situation, the vehicle is able to continue its autonomous travel without a driver having to intervene in order to do so.

According to a specific embodiment, it is provided that the device for operating a vehicle is set up or developed to execute or implement the method for operating a vehicle.

According to a specific embodiment, the detection device includes an environment-sensor system for detecting the vehicle environment. In particular, the environment-sensor system includes one or more environmental sensor(s). An environmental sensor, for example, is an ultrasonic sensor, a radar sensor, a lidar sensor, a laser sensor, or a video sensor.

The detected vehicle environment is thus analyzed particularly with regard to whether or not a switchover is to take place. In other words, a situation analysis of the specifically encountered traffic situation, i.e., the instantaneous traffic situation, in particular, is carried out based on the detected vehicle environment. A decision will then be made as to whether or not a switchover is to take place as a function of the situation analysis.

According to a specific embodiment, it is provided that when the vehicle is operated in the first operating mode and an obstacle that lies in front of the vehicle is detected on the basis of the detected vehicle environment, a switch to the second operating mode takes place.

This results in the particular technical advantage that the obstacle is able to be circumvented efficiently, the reason for this being that the preceding vehicle will normally evade the obstacle, so that the trailing will likewise result in an evasion of the obstacle.

In another specific embodiment, it is provided that when the vehicle is operated in the first operating mode and one or more preceding vehicles(s) that ignore their respective traffic lanes is/are detected based on the detected vehicle environment, a switch to the second operating mode takes place.

This provides the particular technical advantage of reliably detecting when staying within a lane is no longer useful, for if the vehicles driving in front ignore their traffic lanes, i.e., cross over possible lane markings, then this is a strong indication that lane keeping is no longer appropriate given the circumstances. In this case it is more meaningful to follow the vehicles driving ahead, which is then also done due to the switch to the second operating mode.

According to another specific embodiment, it is provided that when the vehicle is operated in the first operating mode and an irregular flow behavior of additional road users is detected on the basis of the detected vehicle environment, a switch to the second operating mode is undertaken.

This results in the particular technical advantage that a situation in which a switch is to take place from the first to the second operating mode is detectable in an efficient manner inasmuch as the irregular flow behavior indicates that the other road users are leaving their own traffic lanes.

A flow behavior in particular describes a behavior of the directions of the velocities of the road users. In other words, a flow includes the vectorial directions of the various velocities of the road users. Road users, for example, are additional vehicles, and irregular means "not uniformly."

In another specific embodiment, a switch to the other operating mode only takes place if one or more of the following condition(s) has/have been met: a vehicle velocity lies within a permitted range; a trajectory or a driving envelope that the vehicle will pursue is collision-free; additional vehicles drive in identifiable columns; a minimum distance between a trajectory or a respective driving envelope that the vehicle will follow and additional road users is observed; a relative velocity of the vehicle with respect to another road user or to other road user(s) lies within a permitted range; a deviation from a behavior in accordance with the law lies within a predefined range, e.g., the deviation includes departing from one's own traffic lane, and the predefined range will then be a maximum distance indication, for example.

This results in the particular technical advantage of allowing a more finely nuanced and more sensitive specification of the timing of a switchover, or in other words, a specification of the kind of conditions that have to be met for the switchover, thereby making it possible to address the respective traffic conditions individually. In particular, the vehicle safety is able to be improved in this way, and especially a collision risk may be reduced in this manner.

Thus, for example, one condition is that a vehicle velocity lies within a permitted range, meaning that a current vehicle velocity must lie within a predefined velocity range for a switchover to take place.

Another condition, for example, is that a trajectory or a driving envelope that the vehicle will follow is collision-free. This advantageously makes it possible to ensure that collisions are avoidable.

For example, if vehicles are driving in the form of obvious columns, then this is a condition for a switch from the first to the second operating mode. The reason is that column-type travel usually takes place only if staying within a lane is no longer expedient. A column within the meaning of the present invention particularly describes a number of vehicles that drive one behind the other and exhibit the same or a similar driving behavior, in particular.

The fact that a minimum distance is maintained or has to be maintained in order to allow or permit a switchover can also advantageously reduce a collision risk. This applies in a similar manner to the requirement that a relative velocity must lie within a permitted or predefined velocity range in order to allow the switchover.

For example, the deviation from a behavior in accordance with the law can be that the vehicle is moving out of its own traffic lane. The reason for this is that leaving one's own traffic lane generally constitutes a deviation from the conventional behavior according to which travel should generally take place inside the traffic lane. However, if the departure from one's own traffic lane only amounts to a predefined maximum distance, this will satisfy the condition for a switchover. In other words, for example, a deviation from the RTA behavior that lies within a predefined range is a condition that must be satisfied for a switchover to take place from the first to the second operating mode.

In another specific embodiment, a driver is monitored, and the switchover from the one operating mode to the other operating mode is additionally carried out as a function of the driver monitoring.

This provides the particular technical advantage that a current driver behavior can be factored into the decision as to whether or not a switchover is to take place.

According to a specific example embodiment, an attention measure pertaining to the driver is ascertained as a function of the driver monitoring, and a switchover takes place as a function of a comparison of the ascertained attention measure with a predefined attention threshold value.

This provides the particular technical advantage that the switchover is able to be made dependent upon the attentiveness of a driver. For example, it is provided that a switchover takes place only if the ascertained attention measure is greater or greater than or equal to the predefined attention threshold value. In all other cases it is provided that no switchover is to take place, in particular, meaning that the vehicle continues to be operated in the current operating mode, for example, or meaning that the driver is asked to assume control of the vehicle, for instance.

According to a specific embodiment, the driver monitoring is carried out with the aid of a driver-monitoring system. For example, such a driver-monitoring system includes a passenger-compartment sensor system for sensing or monitoring a vehicle interior. A passenger-compartment sensor system, for instance, includes a video sensor, an ultrasonic sensor, a radar sensor, a lidar sensor, or a laser sensor. In particular, the passenger-compartment sensor system includes a plurality of such sensors, which particularly can have an identical or, preferably, a different design.

Driver monitoring especially includes fatigue monitoring and, in particular, includes monitoring a driver's gaze. For example, it is checked whether or not a driver's gaze is focused on the road. Thus, a specific embodiment provides that a switch from the first to the second operating mode, or from the second to the first operating mode, takes place only if a driver's eyes are focused on the road.

According to a specific embodiment, a warning of an intended switchover is output, the warning being output to the driver, for instance. This provides the specific technical advantage of making it clear to the driver or also to other vehicle passengers that a switchover is intended, thereby advantageously allowing them to be informed of such a switchover. The knowledge particularly consists of being aware of the fact that a situation is at hand that requires a switchover. In an example embodiment, multiple warnings are output, in particular.

A warning, for example, includes an acoustic and/or a haptic and/or a visual warning.

According to a specific example embodiment, it is provided that a switchover from the one to the other operating mode takes place only if a switchover acknowledgment is detected. This results in the particular technical advantage that a driver, for example, must explicitly acknowledge the switchover. In other words, this specifically means that the driver is required to confirm that a switchover is to take place. No automatic switchover is therefore undertaken according to this embodiment.

According to a specific example embodiment, it is provided that during an operation of the vehicle in the second operating mode, a switch to the first operating mode is carried out only if it is detected on the basis of the detected vehicle environment that a situation that has led to the switch from the first operating mode to the second operating mode is no longer present.

This provides the particular technical advantage of ensuring that the situation that has led to the switch from the first operating mode to the second operating mode has passed, so that a safe return to the first operating mode is then able to take place. In this way a premature switch back to the first operating mode is able to be prevented in an advantageous manner.

Specific embodiments with regard to the device result in a similar manner from specific embodiments with regard to the method, and vice versa. In other words, technical features with regard to the method analogously result from technical features with regard to the device, and vice versa. Functionalities and technical features of the device analogously result from the method, and vice versa.

According to a specific embodiment, the vehicle includes a first operating mode in which the vehicle is autonomously driving inside the traffic lane based on a detection of lane markings of a traffic lane.

According to a specific embodiment, the vehicle includes a second operating mode in which the vehicle autonomously follows a vehicle driving in front while ignoring lane markings.

The term "respectively" includes the wording "and/or," in particular.

In the following text the present invention will be described in greater detail with the aid of preferred exemplary embodiments.

DETAILED DESCRIPTION

Figure 1:
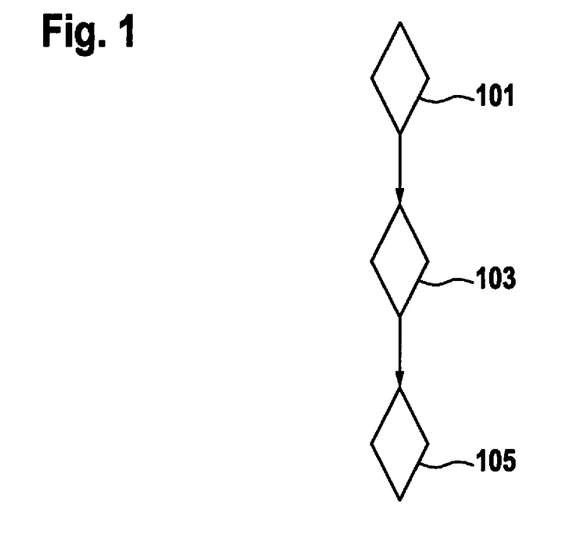
FIG. 1 is a flowchart of a method for operating a vehicle according to an example embodiment of the present invention.

FIG. 1 is a flowchart that illustrates a method for operating a vehicle according to an example embodiment of the present invention. The vehicle is able to be operated in a first operating mode, in which the vehicle is driving autonomously within the traffic lane based on a detection of lane markings of a traffic lane. Furthermore, the vehicle is able to be operated in a second operating mode, in which the vehicle autonomously follows a vehicle driving in front while ignoring lane markings.

According to a step 101, the vehicle is operated in one of the two operating modes, for example, in the first operating mode or in the second operating mode. For example, the vehicle is traveling autonomously within the traffic lane based on a detection of lane markings of a traffic lane according to one of the modes or is autonomously following a vehicle driving in front while ignoring lane markings according to the other of the driving modes.

In a step 103, a vehicle environment is detected, for instance with the aid of an environment-sensor system.

In a step 105, a switch is to take place from the one operating mode of the two operating modes to the other of the two operating modes as a function of the detected vehicle environment. Thus, this means, for example, that a switch takes place from the first operating mode to the second operating mode, or vice versa, as a function of the detected vehicle environment.

Figure 2:
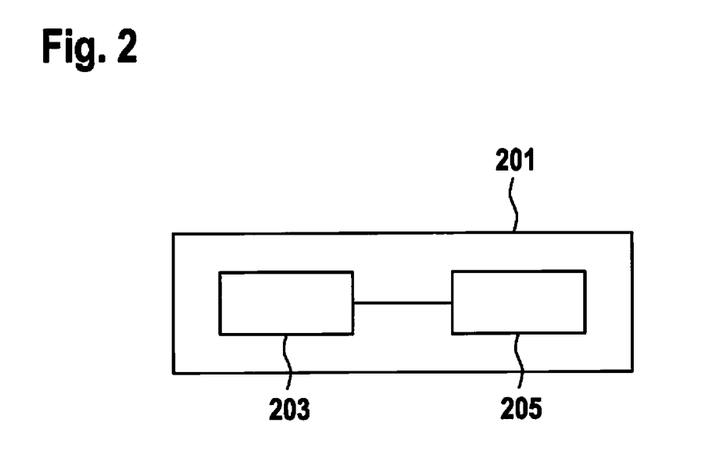
FIG. 2 illustrates a device for operating a vehicle, according to an example embodiment of the present invention.

FIG. 2 shows a device 201 for operating a vehicle. As previously explained, the vehicle is able to be operated in two operating modes. Device 201 includes a control device 203 for operating the vehicle in one of the two operating modes. In other words, control device 203 operates the vehicle in the first operating mode, for instance. Control device 203 is therefore able to control the vehicle autonomously inside a traffic lane based on a detection of lane markings.

In addition, control device 203 is able to operate the vehicle in the second operating mode, meaning that control device 203 autonomously controls the vehicle in such a way that it follows a vehicle driving in front and ignores lane markings in the process. In other words, the control device ignores lane markings for the autonomous trailing and thus does not take them into account.

Moreover, device 201 includes a detection device 205 for detecting a vehicle environment. Detection device 205, for instance, includes an environment-sensor system.

Control device 203 is designed to switch from the one operating mode to the other of the two operating modes as a function of the detected vehicle environment.

Figure 3:
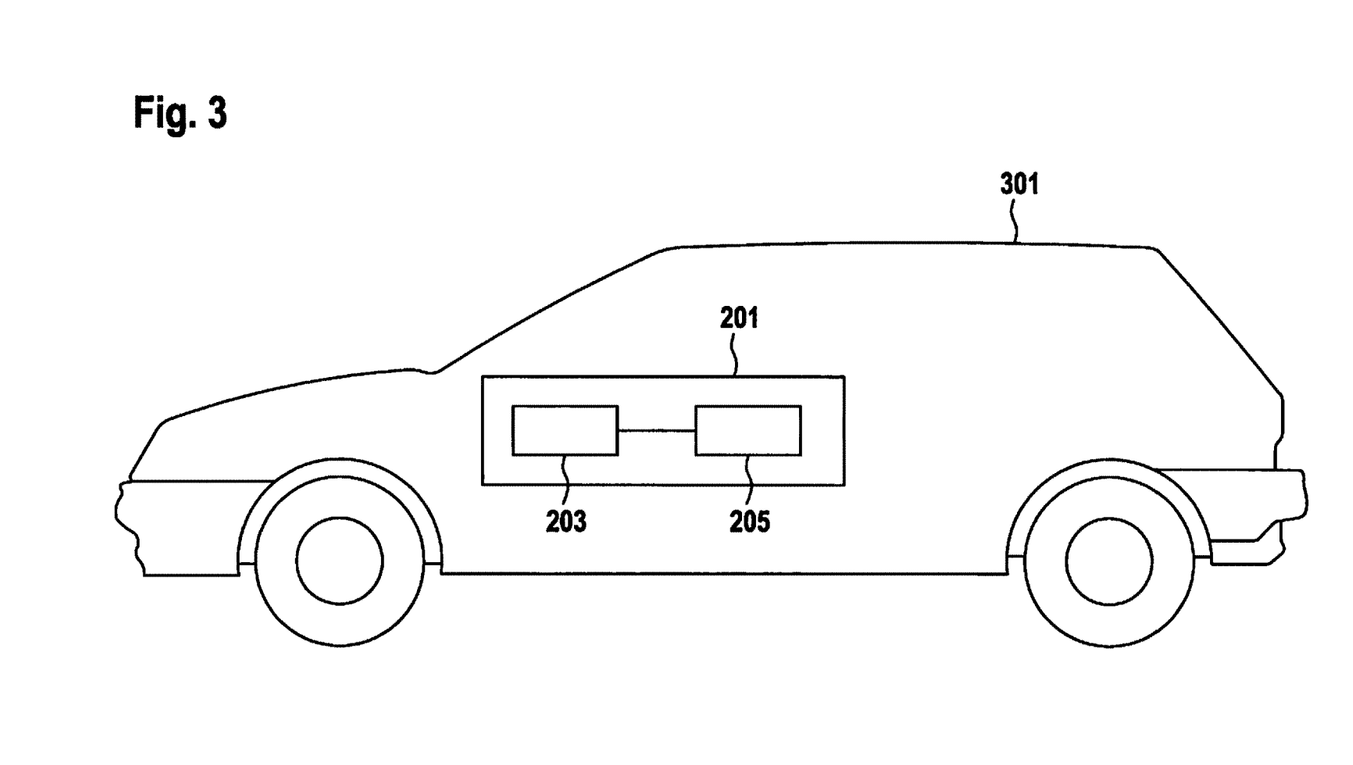
FIG. 3 illustrates a vehicle according to an example embodiment of the present invention.

FIG. 3 shows a vehicle 301. Vehicle 301 includes device 201 from FIG. 2. According to an example embodiment, vehicle 301 is set up or developed to execute or implement the method for operating a vehicle according to the present invention.

Figure 4:
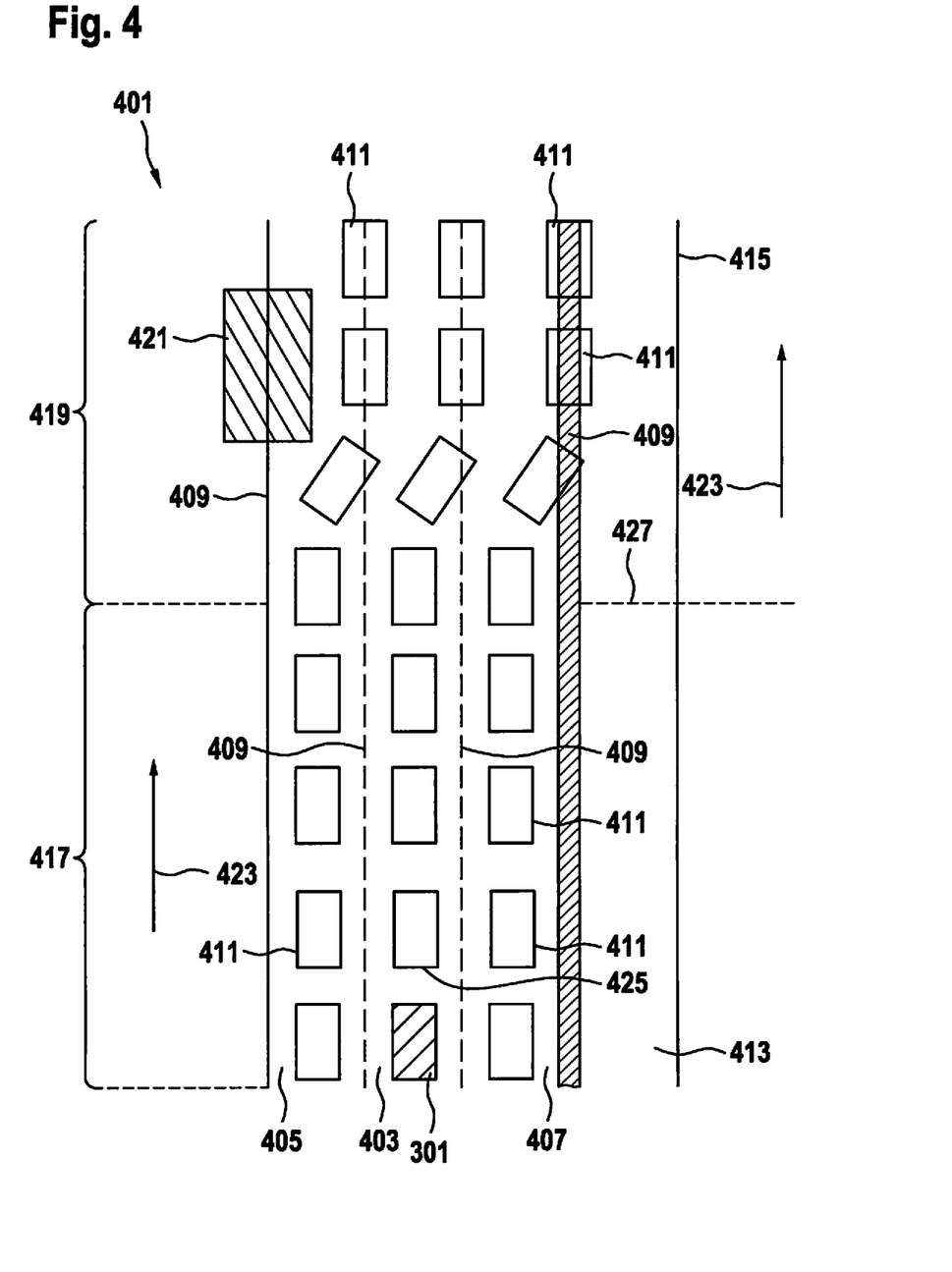
FIG. 4 illustrates a scenario that explains a concept according to the present invention.

FIG. 4 shows a scenario 401 that explains the concept according to the present invention. Shown is vehicle 301, whereas device 201 is not illustrated for reasons of clarity. Vehicle 301 may also be referred to as an ego-vehicle. Vehicle 301 is traveling in center lane 403 of three traffic lanes 405, 407 and, as mentioned, traffic lane 403. Lane markings 409 which delimit traffic lanes 403, 405, and 407 from one another are provided. Multiple vehicles bearing reference numeral 411 are traveling in the three traffic lanes 403, 405, 407. A direction of travel of the vehicles is identified by reference numeral 423. Reference numeral 413 points to a hard shoulder, which is located to the right of outermost right traffic lane 407 in the direction of travel. Reference numeral 415 points to a hard shoulder boundary.

For illustration purposes, the road shown in FIG. 4 according to scenario 401, which encompasses the three traffic lanes 403, 405 and 407, has been exemplarily subdivided into two sections 417 and 419, these sections being identified by a respective curly bracket. In section 417, vehicle 301 travels in the first operating mode, meaning that it detects lane markings 409 in order to remain inside its traffic lane 403. Put another way, lane markings 409 are detected with the aid of an environment-sensor system, for example, so that vehicle 301 is kept within traffic lane 403 in an autonomous manner.

A vehicle 421, which is partially parked in the far left traffic lane 405, is provided in section 419. This vehicle 421 constitutes an obstacle for vehicles that are traveling in far left traffic lane 405. In other words, vehicles 411 traveling in left traffic lane 405 must at least partially leave their traffic lanes 405 in order to circumvent the obstacle, i.e., vehicle 421.

As a result, vehicles 411, which are located in center traffic lane 403 and in the far right traffic lane 407, must move further to the right as well.

In other words, at a certain point in time or starting from a certain location, it no longer makes sense for vehicle 301 to autonomously stay inside its own traffic lane 403 based on detected lane markings 409. A continued operation of the vehicle in the first operating mode is therefore no longer expedient in such a situation, the reason being that a collision might otherwise occur with other vehicles 411 that are evading vehicle 421.

According to an example embodiment of the present invention, a switch to the second operating mode is then provided, in which the vehicle autonomously follows the vehicle driving in front, here explicitly identified by reference numeral 425, while simultaneously ignoring lane markings 409. As a result, vehicle 301 will then no longer be traveling within its own traffic lane but instead, due to the evasive maneuver, will follow vehicle 425 traveling in front and leave traffic lane 403, meaning that lane markings 409 are crossed.

The boundary between the two sections 417, 419 is symbolically marked by a dashed line bearing reference numeral 427. Starting from this dashed line 427, a switch from the first operating mode to the second operating mode takes place. This is done, in particular, because vehicle 301 recognizes based on the detected environment that an obstacle lies ahead, i.e., vehicle 421 in this case, so that an evasive maneuver is required. Furthermore, the location or the instant of the switchover is also detectable on account of the fact that the vehicles driving in front are no longer driving within their own traffic lanes, i.e., are leaving their traffic lanes. In particular, the location or the instant can also be determined by detecting a flow behavior of further vehicles 411 as an irregular flow behavior.

As soon as vehicle 301 has passed obstacle 421, for example, a switch back to the first operating mode takes place again. In particular, in an example embodiment, a switch back to the first operating mode is made only if it is detected that the vehicles driving in front and/or further vehicles 411 driving parallel to vehicle 301 have returned to their own traffic lane. In particular, for example, in an example embodiment, a switch to the first operating mode is carried out only if a regular flow behavior of further vehicles 411 is detected.

The concept according to the present invention can be used in a congestion-pilot function, in particular, meaning, for example, that a congestion-pilot driver assistance system that has integrated the concept according to the present invention is provided.

Thus, the present invention particularly and inter alia encompasses the notion that a switchover takes place in a situation where driving inside the traffic lane is no longer possible on account of the situation, meaning that the vehicle driving in front will now be trailed and the lane markings be ignored. In other words, for example, a switch from an RTA-conforming behavior to a column/maneuver-type behavior takes place. The vehicle can thus travel on top of a lane marking as the case may be. In the second operating mode, the driving behavior of vehicle 301 therefore constitutes a column and/or a maneuver-type behavior, for instance. Vehicle 301 thus follows the maneuvers of the vehicle driving in front, especially in the second operating mode. More specifically, in the second operating mode vehicle 301 travels as or in the form of a column jointly with the vehicle driving in front.

This switch from the first to the second operating mode according to the present invention is provided especially in situations in which an obstacle has to be circumvented. More specifically, the concept of the present invention of switching from the first to the second operating mode can also be provided where (a) driving in areas where roadwork takes place and numerous lane markings are normally provided which the conventional driver-assistance systems are no longer able to distinguish in an unambiguous manner; and/or (b) driving on roads on which lane markings are (briefly) no longer available.

The concept according to the present invention of detecting the vehicle environment and the switchover that is based thereon advantageously makes it possible to identify situations which require a switch of the driving task of autonomous driving based on detected lane markings to a driving task of autonomous driving based on trailing the vehicle driving in front while ignoring the lane markings, i.e., a switch to a maneuver-type/column behavior.

A situation of this kind requiring a switchover is detected on the basis of at least one or more of the following criterions/criteria, such as: (a) one or more obstacle(s) is/are detected in a traffic lane or a plurality of traffic lanes; (b) a vehicle driving in front and, for example, vehicles driving in parallel is/are no longer traveling in its/their own traffic lane(s); and/or (c) a flow behavior (directions of the velocities) of the road users, in particular a flow behavior of the further vehicles, is no longer regular.

According to an additional or alternative specific example embodiment, a switchover only takes place if at least one or more of the following condition(s) and/or restriction(s) is/are satisfied: (a) a vehicle velocity lies within a permitted range; (b) a trajectory or a driving envelope that the vehicle will travel is collision-free; (c) additional or other vehicles drive in obvious columns (and not in a random fashion); (d) a distance along the trajectory or travel envelope that will be driven by one's own vehicle, from all further or other road users is greater or greater than or equal to a predefined minimum distance, i.e., is of sufficient size, in particular; (e) a distance along the trajectory or the driving envelope that the vehicle will travel, from all other or further stationary obstacles is greater or greater than or equal to a predefined minimum distance, i.e., is of sufficient size, in particular; (f) a relative velocity of the vehicle with regard to other road users lies within a permitted range; and/or (g) a deviation from a law-conforming behavior, in particular from an RTA-behavior, lies within a predefined range, e.g., a maximum departure from one's own lane by x meters, x being a placeholder for a specific numerical value.

According to a specific embodiment, driver monitoring is provided, which in particular is used as an additional criterion for the decision as to whether a switchover is to take place. For example, a driver will be informed that a switchover from the first operating mode to the second operating mode or from the second operating mode to the first operating mode is intended (for instance a deviation from the RTA-behavior if a switch takes place from the first to the second operating mode) and increased attention is consequently required.

According to a specific example embodiment, additional conditions that must be satisfied for a switchover can then include one or more of the following condition(s): (a) a driver has confirmed the deviation from the RTA-behavior, i.e., the driver has generally confirmed the switchover; and/or (b) the driver is not distracted and is monitoring the situation, for instance has his or her eyes on the road.

If at least a few, and preferably all, of the aforementioned conditions are satisfied, then a specific embodiment provides that a switch takes place from the first to the second operating mode, e.g., from an RTA-behavior to a maneuver-type/column behavior, for example.

A specific embodiment provides that, after the change or switchover, it is analyzed in the second operating mode when the situation that has led to the switchover to the second operating mode has passed. In other words, for example, it is analyzed when another change or switch back to an RTA-behavior has to take place again, i.e., in general, when another switch to the first operating mode is required. According to further specific embodiments, the requisite conditions result in reverse analogy to the conditions and criteria with regard to the switch from the first to the second operating mode. For example, it is switched back when no further obstacle lies ahead or when the obstacle has been circumvented. It is switched back, for instance, when a flow behavior of the road users is regular. For example, a switchover takes place when vehicles driving in front are returning to their original traffic lanes again, and it is switched back, for example, when vehicles driving in front are once again following a traffic lane, i.e., are driving within a traffic lane.

What is claimed is:

1. A method for operating a first vehicle, the method comprising:
   operating, by a control device, the first vehicle in a first operating mode, the first operating mode being an operating mode in which the first vehicle travels autonomously inside a traffic lane based on detection of lane markings of the traffic lane;
   detecting, by the control device, a vehicle environment; and
   switching, by the control device, the first vehicle from operating in the first operating mode to operating in a second operating mode as a function of the detected vehicle environment, the second operating mode being an operating mode in which the first vehicle autonomously follows a second vehicle while ignoring existing lane markings of the traffic lane.

2. The method of claim 1, wherein the detecting is (a) of an obstacle lying in front of the first vehicle, as the detected vehicle environment, and (b) while the first vehicle is operated in the first operating mode; and wherein based on the detecting, the first vehicle switching from operating in the first operating mode to operating in the second operating mode.

3. The method of claim 1, wherein the detecting is (a) of one or more vehicles in front of the first vehicle ignoring their respective traffic lanes, as the detected vehicle environment, and (b) while the first vehicle is operated in the first operating mode; and wherein based on the detecting, the first vehicle switching from operating in the first operating mode to operating in the second operating mode.

4. The method of claim 1, wherein the detecting is (a) of an irregular flow behavior of road users, as the detected vehicle environment, and (b) while the first vehicle is operated in the first operating mode; and wherein based on the detecting, the first vehicle switching from operating in the first operating mode to operating in the second operating mode.

5. The method of claim 1, wherein the switching is performed conditional upon satisfaction of at least one condition, the at least one condition including that (a) a vehicle velocity lies within a permitted range, (b) a trajectory or a driving envelope that the first vehicle will travel is collision-free, (c) other vehicles travel in obvious columns, (d) a minimum distance between a trajectory or a travel envelope that the first vehicle will travel and other road users is observed, (e) a relative velocity of the first vehicle with respect to one or more other road users lies within a permitted range, and (f) a deviation from a law-conforming behavior lies within a predefined range.

6. The method of claim 5, wherein the at least one condition includes the condition that the deviation from the law-conforming behavior lies within a predefined range and the deviation relates to a departure from a traveled traffic lane.

7. The method of claim 6 wherein the predefined range is of distances within a predefined maximum distance.

8. The method of claim 1, wherein a driver is monitored, and the switching carried out additionally as a function of the driver monitoring.

9. The method of claim 8, wherein a measure of attention pertaining to the driver is ascertained as a function of the driver monitoring, and a switching is carried out as a function of a comparison of the ascertained measure of attention with a predefined attention threshold value.

10. The method of claim 1, further comprising outputting a warning of an intended switchover.

11. The method of claim 10, wherein the switching is performed conditional upon detection of a switchover acknowledgement.

12. The method of claim 1, further comprising switching the first vehicle from operating in the second operating mode to operating in the first operating mode in response to determining, based on the vehicle environment, that a situation that had led to the switch from operating the first vehicle in the first operating mode to operating the first vehicle in the second operating mode has passed.

13. A device for operating a first vehicle, the device comprising:
  a detection device; and
  a control device;
  wherein the control device is configured to:
    operate the first vehicle in a first operating mode, the first operating mode being an operating mode in which the first vehicle travels autonomously inside a traffic lane based on detection of lane markings of the traffic; and
    switch the first vehicle from operating in the first operating mode to operating in a second operating mode as a function of a vehicle environment detected by the detection device, the second operating mode being an operating mode in which the first vehicle autonomously follows a second vehicle while ignoring existing lane markings of the traffic lane.

14. A non-transitory computer-readable medium on which are stored instructions that are executable by a processor and that, when executed by the processor, cause the processor to perform a method of operating a first vehicle, the method comprising:
  operating the first vehicle in a first operating mode, the first operating mode being an operating mode in which the first vehicle travels autonomously inside a traffic lane based on detection of lane markings of the traffic lane; and
  switching the first vehicle from operating in the first operating mode to operating in a second operating mode as a function of a detected vehicle environment, the second operating mode being an operating mode in which the first vehicle autonomously follows a second vehicle while ignoring existing lane markings of the traffic lane.

15. The device of claim 13, wherein based on the detection device detecting, while the first vehicle is operating in the first operating mode, an obstacle lying in front of the first vehicle, the control device switches the first vehicle from operating in the first operating mode to operating in the second operating mode.

16. The device of claim 13, wherein the detection device detecting, while the first vehicle is operating in the first operating mode, one or more vehicles in front of the first vehicle ignoring their respective traffic lanes, the control device switches the first vehicle from operating in the first operating mode to operating in the second operating mode.

17. The device of claim 13, wherein based on the detecting device detecting, while the first vehicle is operating in the first operating mode, an irregular flow behavior of road users, the control device switches the first vehicle rom operating in the first operating mode to operating in the second operating mode.

18. The device of claim 13, wherein the control device is configured to switch the first vehicle from operating in the second operating mode to operating in the first operating mode in response to determining, based on the vehicle environment, that a situation that had led to the switch of the vehicle from operating in the first operating mode to operating in the second operating mode has passed.

* * * * *